United States Patent [19]

Andrews et al.

[11] Patent Number: 5,243,519
[45] Date of Patent: Sep. 7, 1993

[54] METHOD AND SYSTEM FOR LANGUAGE TRANSLATION WITHIN AN INTERACTIVE SOFTWARE APPLICATION

[75] Inventors: Greg P. Andrews; William C. Rapp; Phillip C. Schloss; Daniel D. Schulz; Schuman Shao, all of Rochester, Minn.

[73] Assignee: International Business Machines Corporation, Armonk, N.Y.

[21] Appl. No.: 837,797

[22] Filed: Feb. 18, 1992

[51] Int. Cl.⁵ .............................................. G06F 15/38
[52] U.S. Cl. ................... 364/419.05; 395/155
[58] Field of Search ............... 364/419; 395/155, 156, 395/157

[56] References Cited

U.S. PATENT DOCUMENTS

| | | | |
|---|---|---|---|
| 4,615,002 | 9/1986 | Innes | 364/419 |
| 4,870,610 | 9/1989 | Belfer | 364/419 |
| 4,980,829 | 12/1990 | Okajima et al. | 364/419 |
| 5,001,697 | 3/1991 | Torres et al. | |
| 5,067,070 | 11/1991 | Miyao et al. | 364/419 |

OTHER PUBLICATIONS

Miscellaneous Search Report, IBM 82, "Automatic Reduction/magnification System for Window Frame," Patent No. JP 02-176824.

*Primary Examiner*—Roy N. Envall, Jr.
*Assistant Examiner*—Jennifer L. Hazard
*Attorney, Agent, or Firm*—Andrew J. Dillon

[57] ABSTRACT

A method and system for facilitating language translation of text fields within an interactive software application. A control parameter is associated with each text field within an interactive softwave application prior to translation and utilized to automatically extract each text field for translation and to reinsert a translated text field thereafter. In certain interactive software applications which utilize fixed template user-interface structures, such as dialog boxes or menu templates, the architecture will not permit captions or menu pulldown controls to be identified within the template. In such applications, an additional artificial control parameter is included within the template which contains an identifier of the text field for the caption or menu pulldown control. Thereafter, the control parameters may be utilized to automatically extract text fields for translation. An attempted automatic extraction of text fields for translation in an application, which includes dialog boxes or menu templates, will result in an error message in the absence of the required artificial control parameter.

6 Claims, 7 Drawing Sheets

METHOD AND SYSTEM FOR LANGUAGE TRANSLATION WITHIN AN INTERACTIVE SOFTWARE APPLICATION

BACKGROUND OF THE INVENTION

1. Technical Field

The present invention relates in general to the field of interactive software applications, and in particular to methods and systems for facilitating language translation of text fields within interactive software applications. Still more particularly, the present invention relates to methods and systems which permit the automatic extraction of text fields from interactive software applications for translation.

2. Description of the Related Art

The global nature of the world today has created an increased market for computer hardware and software applications which may be simply translated into a large number of foreign languages. Indeed, National Languages Support (NLS) is increasingly important, as the market for data processing systems is ever expanding. While the demands upon hardware systems are minimal and are often solved by the provision of special keyboard characters, the large textual content of many software applications leads to a more difficult problem.

The translation of a software application into a foreign language for utilization in a foreign market is generally accomplished utilizing a batch process wherein the text may be edited with a text editor. The resultant translation must then be verified with a simulation of the display screens of the software application, or by executing the program after translation has occurred. Additional changes brought about by variations induced due to the contextual nature of a text entry, or as a result of simple size differences between a textual entry in two different languages must be edited in the batch process and the verification program repeated.

The simulation of computer program external interfaces in order to permit the interface to be evaluated prior to encoding the software is the primary method for creating an interactive software application in a foreign language. For example, U.S. Pat. No. 4,845,665, issued to Heath et al., and assigned to the Assignee herein, discloses a technique for the simulation of a computer program external interfaces which is intended to permit users to evaluate the design and alter the display screens prior to committing to an encoding of the software code.

Another technique has recently been proposed in U.S. patent application Ser. No. 07/687,257, entitled *In-Context Translation for Personal Computer Applications*, filed Apr. 18, 1991, and assigned to the Assignee herein. This technique permits textual entries within an interactive software application to be examined in context during the translation process to greatly enhance the quality of the resultant translation. By observing the textual entries within the context of the display screen, and by observing the physical limitations of the field, or display area in which the textual entry is to be displayed, a translator may simply and efficiently select optimal language for converting textual entires of an interactive software application into a selected foreign language.

A problem which exists in certain interactive software applications is the location or extraction of textual entries in applications which utilize certain types of user-interface structures, such as dialog boxes or menu templates, which are in a physical format which is strongly coupled to the length of text fields within the dialog box or menu template. A method and system are therefore needed which can extract those textual entries for translation while utilizing existing dialog box support structures, but which can dynamically adjust those structures at run time utilizing the translated text obtained from an external source.

SUMMARY OF THE INVENTION

It is therefore one object of the present invention to provide an improved interactive software application.

It is another object of the present invention to provide an improved method and system for facilitating language translation of text fields within interactive software applications.

It is yet another object of the present invention to provide an improved method and system for permitting the automatic extraction of text fields from interactive software applications for translation.

The foregoing objects are achieved as is now described. A control parameter is associated with each text field within an interactive software application prior to translation and utilized to automatically extract each text field for translation and to reinsert a translated text field thereafter. In certain interactive software applications which utilize fixed template user-interface structures, such as dialog boxes or menu templates, the architecture will not permit captions or menu pulldown controls to be identified within the template. In such applications, an additional artificial control parameter is included within the template which contains an identifier of the text field for the caption or menu pulldown control. Thereafter, the control parameters may be utilized to automatically extract text fields for translation. An attempted automatic extraction of text fields for translation in an application, which includes dialog boxes or menu templates, will result in an error message in the absence of the required artificial control parameter.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
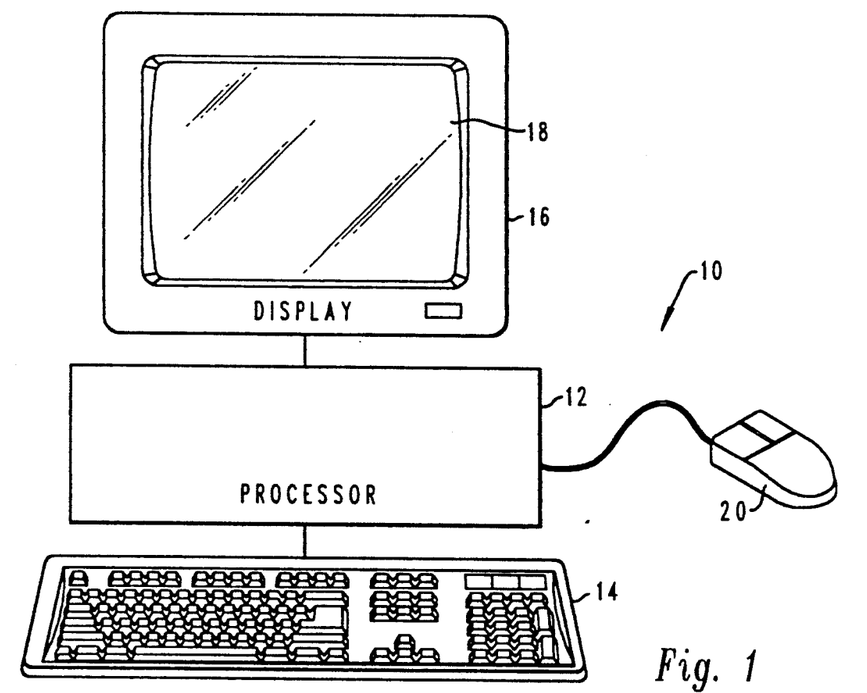
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. As is illustrated, data processing system 10 includes a processor 12 which is coupled to a keyboard 14 and display device 16 in a manner well known in the art. Display device 16 includes a display screen 18. Additionally, a graphic pointing device, such as mouse 20, is also coupled to processor 12 and may be utilized, in a so-called "graphic user interface" to enter operator inputs and commands to processor 12.

Those skilled in the art upon reference to the foregoing will appreciate that data processing system 10 may be implemented by utilizing any suitable computer including the so-called "personal computer" or a workstation coupled to a mainframe host computer, such as the Application System/400, manufactured by International Business Machines Corporation. One other example of a data processing system which may be utilized to implement the method and system of the present invention is the International Business Machines Corporation PS/2.

As those skilled in the art will appreciate, data processing system 10 may be utilized to execute interactive software applications, such as text processors, spread sheets, graphic processors or the like. As is common in such interactive software applications display screens including multiple textual entries for commands, instructions and the like are periodically displayed during the execution of such applications utilizing display screen 18 of display device 16. Thus, in order to facilitate the utilization of an interactive software application by a foreign national, it is necessary to translate a large number of textual entries into the foreign language for display within display device 18.

Figure 2:
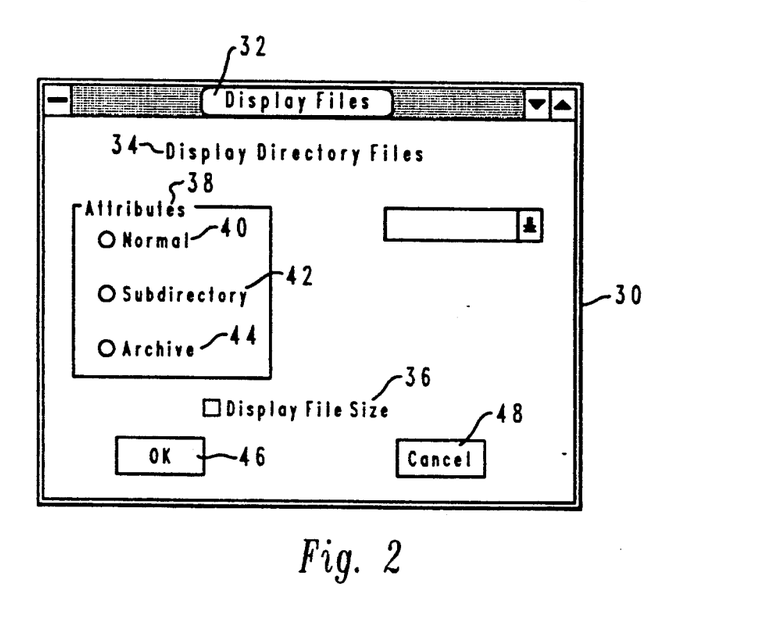
FIG. 2 is a pictorial representation of a display screen of an interactive software application depicting a dialog box, which may be translated utilizing the method and system of the present invention.

Referring now to FIG. 2, there is depicted a pictorial representation of a display screen of an interactive software application depicting a dialog box 30, which may be translated utilizing the method and system of the present invention. Those skilled in the art will appreciate that in certain interactive software applications which utilize a Graphic User Interface (GUI), such as Microsoft Windows or International Business Machines OS/2 Presentation Manager, a user-interface structure, such as the dialog box depicted within FIG. 2, is often utilized as an interface to the application. As is common in such applications, a dialog box may include a textual caption or window title 32, which characterizes the particular utilization or purpose for the user interface structure depicted.

Additionally, multiple text fields, such as text fields 34, 36, 38, 40, 42, 44, 46, and 48 are provided within dialog box 30. Text fields 34-48 are typically provided in an environment which includes a control parameter setting forth the size of the text field; however, these environments typically do not permit a control identifier to be associated with the textual caption or window title.

Thus, in accordance with an important feature of the present invention, a method and system provided whereby a textual caption or window title may be automatically extracted and identified for translation purposes. As will be explained in greater detail herein, this is accomplished in the present application by inserting within the template, which is utilized to create dialog box 30, an artificial control which is set to a zero length text string having zero width and zero height. This artificial control preferably contains an identifier of the text string to be utilized for the textual caption or window title.

By inserting an artificial control of the type described as the first control within the template utilized to create dialog box 30, a link to an identifier of a text string which may be utilized to translate textual caption 32 may be established. Additionally, as will be explained in greater detail herein, the control parameter associated with each textual field within dialog box 30 is preferably provided with a variable expansion space on the right hand side of the control, to permit the control to be lengthened to accommodate an increase in text size which may occur as a result of translation. Those skilled in the art will appreciate that an accommodation for an increase in the size of the textual caption is not necessary as this adjustment is typically handled by the environment which expands the size of the window based upon the length of the caption.

Figure 3:
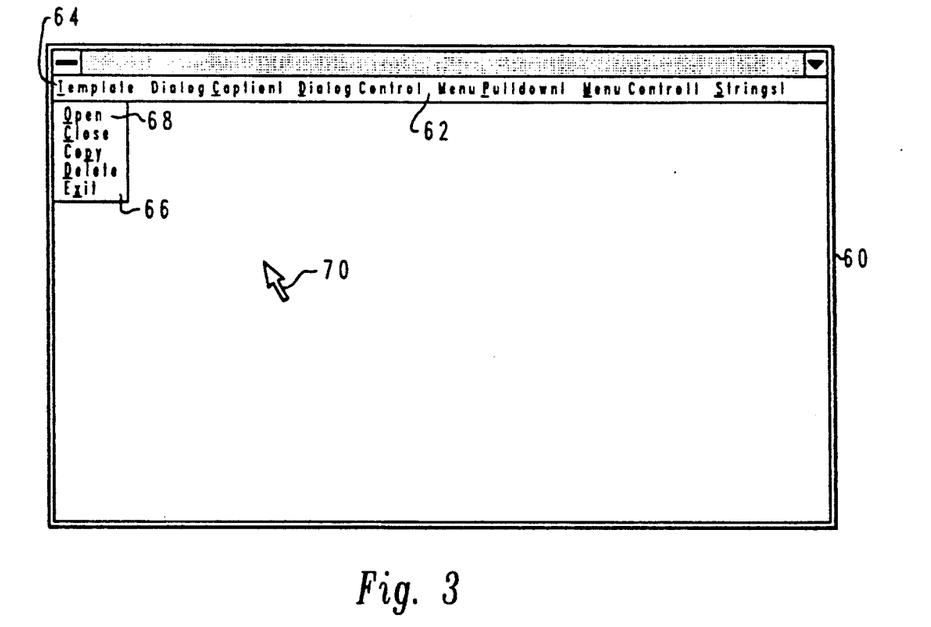
FIG. 3 is a pictorial representation of a display screen of an interactive software application depicting a menu template which may be translated utilizing the method and system of the present invention.

With reference now to FIG. 3, there is depicted a pictorial representation of a menu template 60 of a type which is typically utilized in a graphic user interface of the type described above. As is typical in such menu templates, a command bar 62 is provided which typically includes a plurality of pulldown controls, or high level menu selections. A selection of one of these high level menu selections, such as high level menu selection 64, utilizing mouse pointer 70, will result in a submenu 66 being displayed. As will be explained in greater detail herein, such graphic user interfaces typically do not permit a control to be associated with a high level menu selection. Therefore, in accordance with an important feature of the present invention, an artificial control is associated with the first submenu control within pulldown menu 66. The artificial control preferably includes an identifier of the text string which is to be utilized for the associated high level menu selection.

Figure 4:
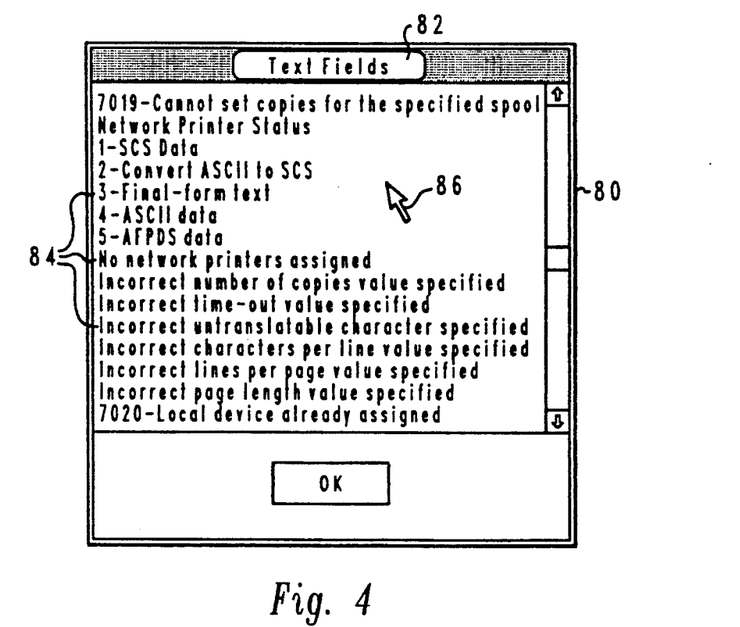
FIG. 4 is a pictorial representation of a display screen of an interactive software application depicting a plurality of text fields extracted utilizing the method and system of the present invention.

Referring now to FIG. 4, there is depicted a pictorial representation of a display screen 80 of an interactive software application which depicts a plurality of text fields 84 which have been extracted utilizing the method and system of the present invention. As will be described in greater detail below, text fields within an interactive software application may be automatically extracted from that interactive software application for translation utilizing a plurality of control parameters which are associated with each text field within the application. After extracting a plurality of text fields in this manner, any suitable translation application may be utilized to permit an operator to select a particular text field, utilizing mouse pointer 86 and thereafter translate that text field for subsequent insertion into the interactive software application. Those skilled in the art will appreciate that any suitable translation technique may be utilized, including the contextual translation technique described above.

Figure 5:
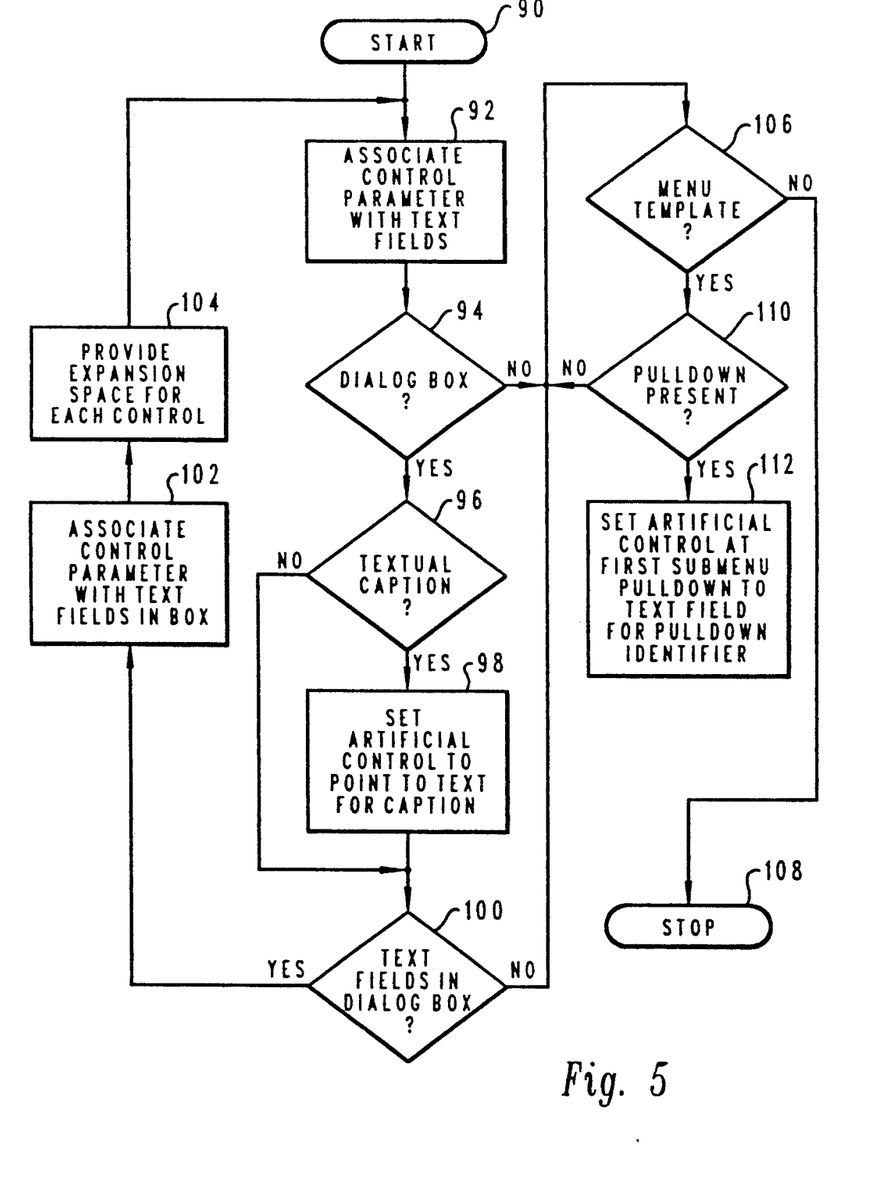
FIG. 5 is a high level flowchart illustrating the association of control parameters with various text fields in an interactive software application in accordance with the method and system of the present invention.

With reference now to FIG. 5, there is depicted a high level flowchart which illustrates the association of control parameters with various text fields in an interactive software application in accordance with the method and system of the present invention. As illustrated the process begins at block 90 and thereafter passes to block 92 which depicts the association of a control parameter with each text field within the interactive software application for those applications which do not already include such a control parameter. Those skilled in the art will appreciate that the simple association of a control parameter with a text field within an interactive software application is not difficult; however, existing Graphical User Interface architectures, such as Microsoft Windows, or International Business Machines Corporation OS/2 Presentation Manager utilize structured user-interface displays which do not permit a control to be associated with selected textual fields therein. For example, as described above, a textual caption or window title or a high level menu selection are examples of text fields for which the association of a control parameter may not be simply accomplished.

In order to accommodate such user-interface structures, the process of the present application passes to block 94 which illustrates the determination of whether or not a dialog box has been encountered during an examination of the interactive software application. If not, the process merely continues to associate control parameters with text fields within the application until such time as a dialog box has been encountered. Still referring to block 94, in the event a dialog box is encountered, the process passes to block 96. Block 96 illustrates a determination of whether or not the dialog box encountered includes a textual caption. If so, the process passes to block 98 which illustrates the setting of an artificial control having a unique value within the template for the dialog box which points to the identifier of the text string to be utilized for the caption. As described above, those skilled in the art will appreciate that a control set to a zero length text string having zero width and zero height may clearly be identified as a artificial control and as such may be utilized to point to the identifier of the text string to be utilized for the caption. Those skilled in the art will appreciate that additional formats for artificial controls may also be utilized.

Thereafter, or in the event the dialog box does not include a textual caption, as determined at block 96, the process passes to block 100. Block 100 illustrates a determination of whether or not additional text fields exist within the dialog box. If so, the process passes to block 102. Block 102 illustrates the association of a control parameter with each text field within the dialog box and the process then passes to block 104. Block 104 depicts the provision of expansion space for each control associated with a text field within the dialog box such that the expansion of the text due to translation may be accommodated. Thereafter, the process returns to block 92.

Referring again to block 100, in the event no text fields remain to be processed within a dialog box, the process passes to block 106. Block 106 illustrates a determination of whether or not a menu template has been encountered, and if not the process passes to block 108 and terminates.

Referring again to block 106, in the event a menu template has been encountered, the process passes to block 110. Block 110 illustrates a determination of whether or not a pulldown or high level menu selection is present within the menu template. If not, the process returns to block 106 to determine if additional menu templates are present for processing. However, in the event a pulldown or high level menu selection is present, as determined at block 110, the process passes to block 112. Block 112 illustrates the setting of an artificial control in association with the first submenu pulldown under the high level menu selection which includes an identification of the text field for the pulldown identifier.

Upon reference to the foregoing, those skilled in the art will appreciate that in addition to associating a control parameter with each text field within the interactive software application, the process described herein permits an artificial control parameter to be established in association with each dialog box and/or menu template which may be utilized to identify a textual window caption or window title, or a high level menu selection in those environments in which control parameters are not permitted to be associated with such text fields.

Figure 6A:
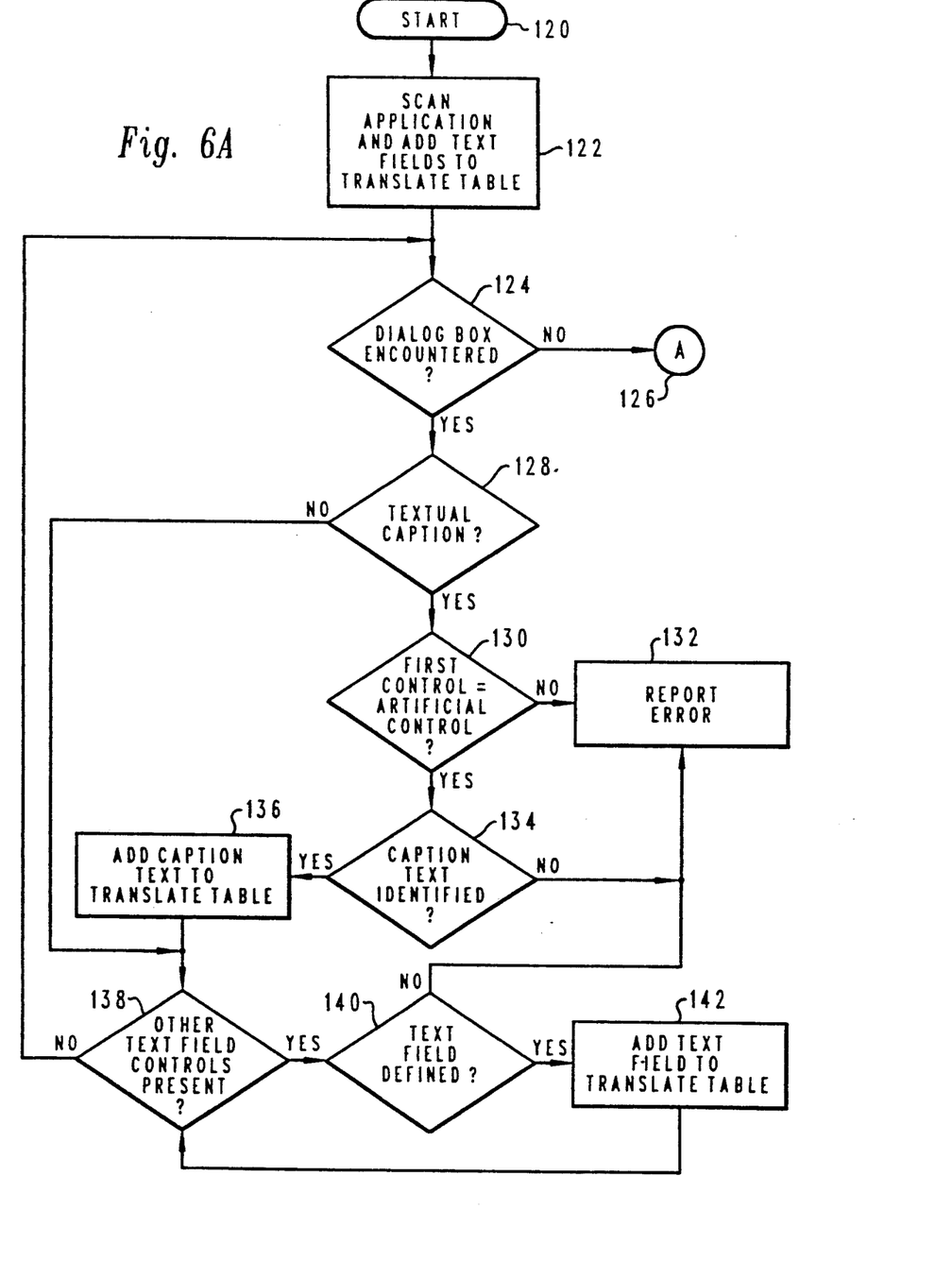
FIGS. 6a and 6b form a high level flowchart illustrating the automatic extraction of text fields from an interactive software application in accordance with the method and system of the present invention.
Figure 6B:
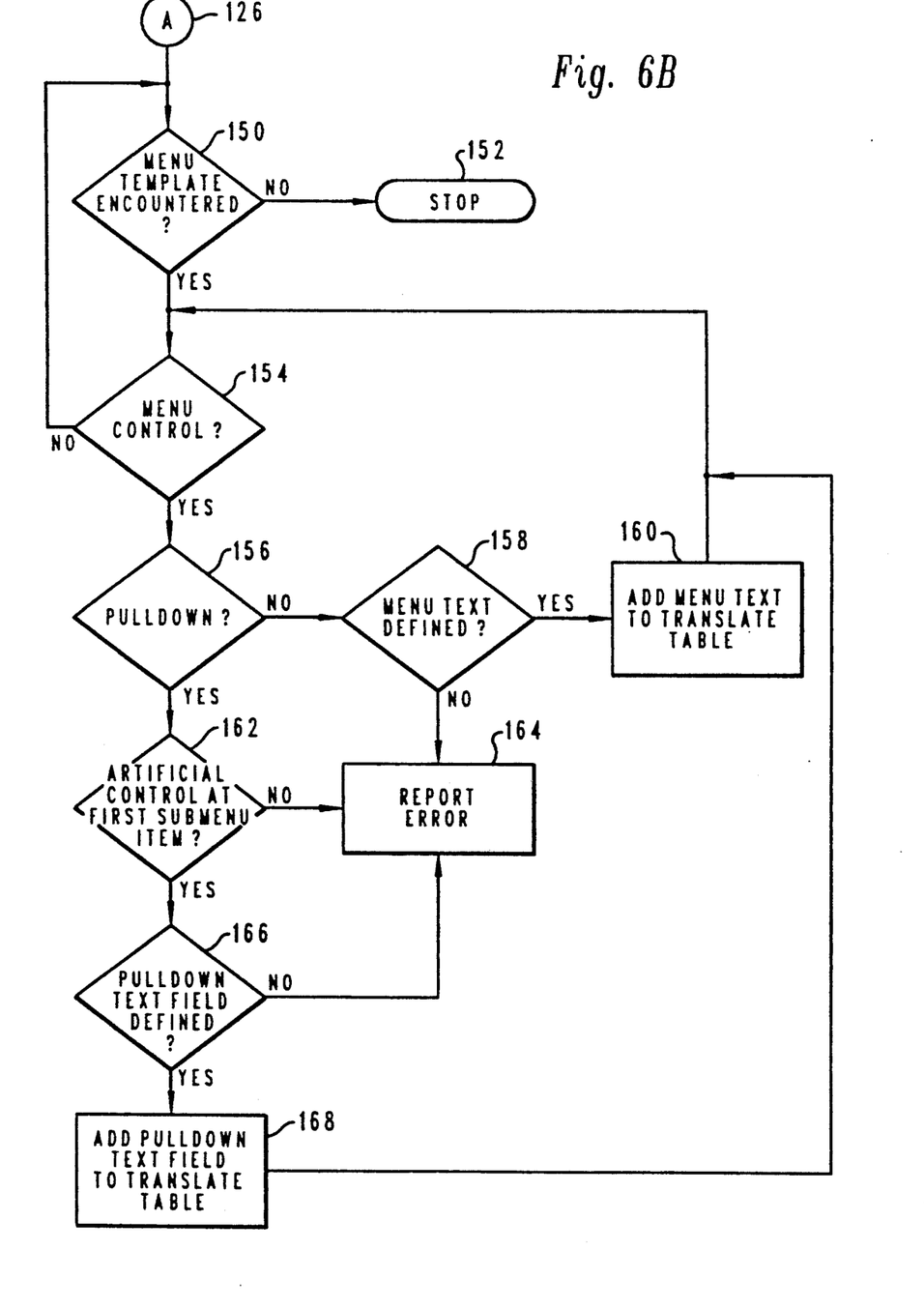

Referring now to FIGS. 6a and 6b, there is illustrated a high level flowchart which depicts the automatic extraction of text fields from an interactive software application in accordance with the method and system of the present invention. As illustrated, the process begins at block 120 and thereafter passes to block 122. Block 122 depicts the scanning of the application and the addition of each text field associated with a control parameter to the translate table. As described above, each text field may be listed within a window in the manner described with respect to FIG. 4 and each text field may thereafter be selected by a user for translation utilizing any suitable translation technique.

Next, the process passes to block 124. Block 124 illustrates a determination of whether or not a dialog box has been encountered. As described above, those skilled in the art will appreciate that special processing techniques must be utilized with certain user-interface structures, such as dialog box due to the inability of such architectures to permit a control parameter to be associated with certain text elements included within a dialog box. If no dialog box is encountered, the process passes, via connector 126, to the portion of the flowchart contained within FIG. 6b, which illustrates the processing of menu templates.

Referring again to block 124, in the event a dialog box is encountered, the process passes to block 128. Block 128 illustrates a determination of whether or not the dialog box encountered includes a textual caption. If so, the process passes to block 130, which depicts a determination of whether or not the first control within the template for the dialog box is an artificial control of the type described above. If not, the process passes to block 132 and reports an error, indicating that automatic extraction for translation is not possible.

Referring again to block 130, in the event the first control within the template associated with the dialog box is the aforementioned artificial control, the process passes to block 134. Block 134 illustrates a determination of whether or not the caption text to be utilized for this dialog box is identified in association with the artificial control. If not, the process again returns to block 132 and reports an error. However, in the event the caption text is identified, the process passes to block 136. Block 136 illustrates the addition of the caption text to the translate table for subsequent translation utilizing any well known translation technique.

Referring again to block 128, in the event the dialog box encountered does not include a window title or textual caption, the process passes to block 138. Additionally, after adding the caption text to the translate table in situations in which the dialog box includes a textual caption, the process also passes to block 138. Block 138 illustrates a determination of whether or not additional text fields are present within the dialog box, each having a control associated therewith. If not, the process returns to block 124 for a determination of whether or not additional dialog boxes are to be processed.

Referring again to block 138, in the event additional text field controls are present within the dialog box under process, the process passes to block 140. Block 140 illustrates a determination of whether or not an associated text field is defined for each control within the dialog box, and if not, the process again returns to block 132, reporting an error which prohibits the automatic extraction of text fields for translation. However, in the event the text field associated with each control within the dialog box is defined, the process passes to block 142, which illustrates the addition of the text field to the translate table for translation, as described above.

Referring now specifically to FIG. 6b, in the event no additional dialog boxes are encountered, as determined at block 124 of FIG. 6a, the process passes, via connector 126, to block 150. Block 150 illustrates a determination of whether or not a menu template has been encountered. If not, the process merely passes to block 152 and terminates. However, in the event a menu template has been encountered, the process passes to block 154. Block 154 illustrates a determination of whether or not a control parameter has been located within the interactive software application while scanning the menu template under consideration. If not, the process iteratively returns to block 150 to continue to scan additional menu templates.

Referring again to block 154, in the event a menu control is present within the menu template under examination, the process passes to block 156. Block 156 illustrates a determination of whether or not the menu template under consideration is a pulldown, or high level menu selection. If not, the process merely passes to block 158 which illustrates a determination of whether or not the menu text has been defined in association with the encountered control and if so, block 160 depicts the adding of that menu text to the translate table for subsequent translation. In the event a menu text associated with the menu control under consideration is not defined, the process passes to block 164, which illustrates the reporting of an error condition, indicating that automatic extraction of menu text fields for translation is not possible.

Referring again to block 156, in the event the menu template under consideration is a pulldown, or high level menu selection, the process passes to block 162. Block 162 illustrates a determination of whether or not an artificial control, such as the type described above, is located at the first submenu item within the pulldown menu. If not, the process again passes to block 164, which illustrates the reporting of an error, indicating that automatic extraction of text fields for translation is not possible.

In the event an artificial control is located at the first submenu item under the high level menu selection under consideration, the process passes to block 166. Block 166 illustrates a determination of whether or not the artificial control at the first submenu item defines the pulldown text field to be utilized. If not, the process again passes to block 164 to report an error, indicating that automatic extraction of text fields for translation is not possible. Referring again to block 166, in the event the pulldown text field is defined in association with the artificial control at the first submenu item under a high level menu selection, the process passes to block 168. Block 168 illustrates the adding of the pulldown text field to the translate table for subsequent translation and the process then returns iteratively to block 154 to continue to examine menu templates for additional controls, indicating the presence of a text field for translation.

Figure 7A:
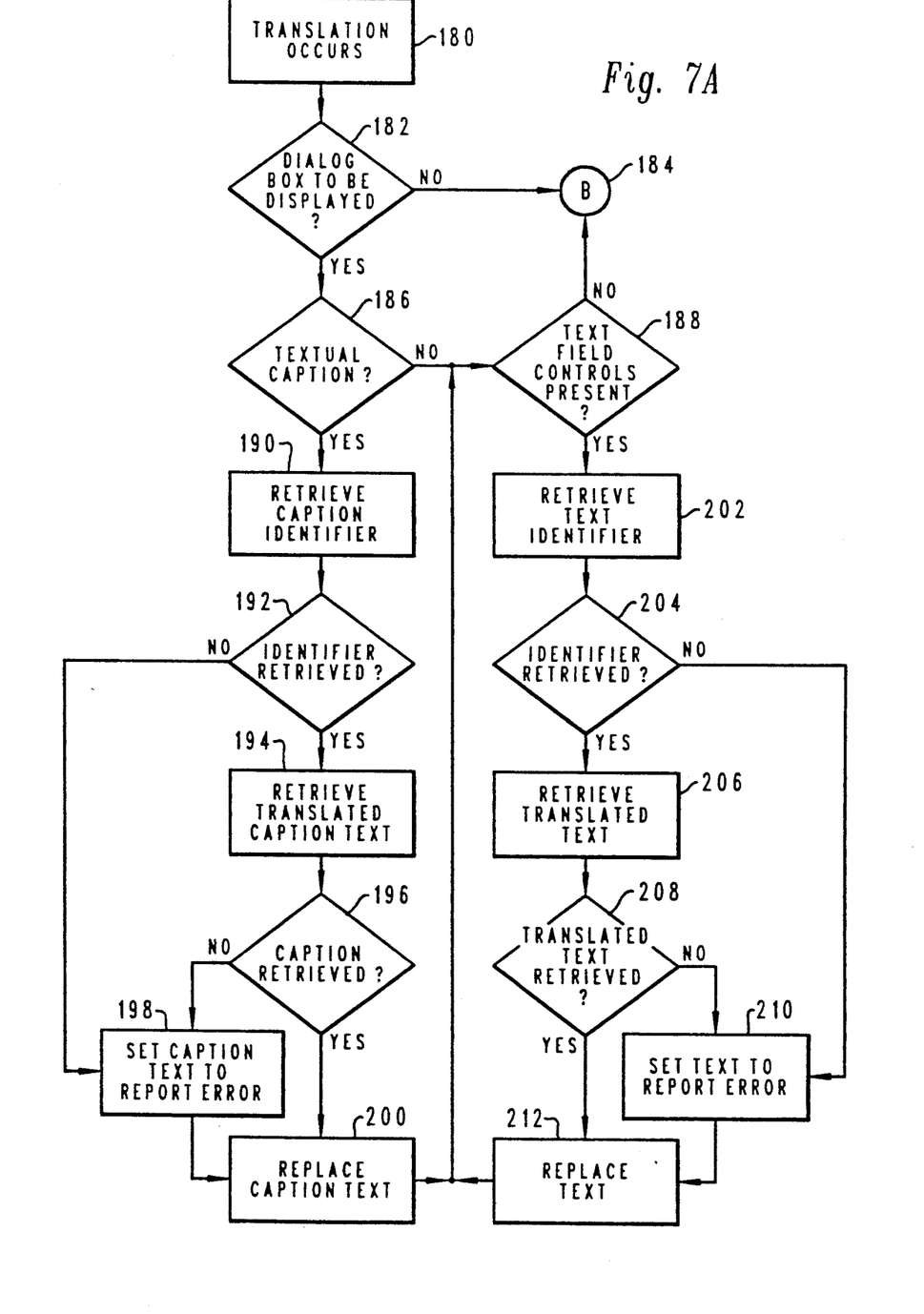
FIGS. 7a and 7b form a high level flowchart illustrating the replacement of translated text within an interactive software application in accordance with the method and system of the present invention.
Figure 7B:
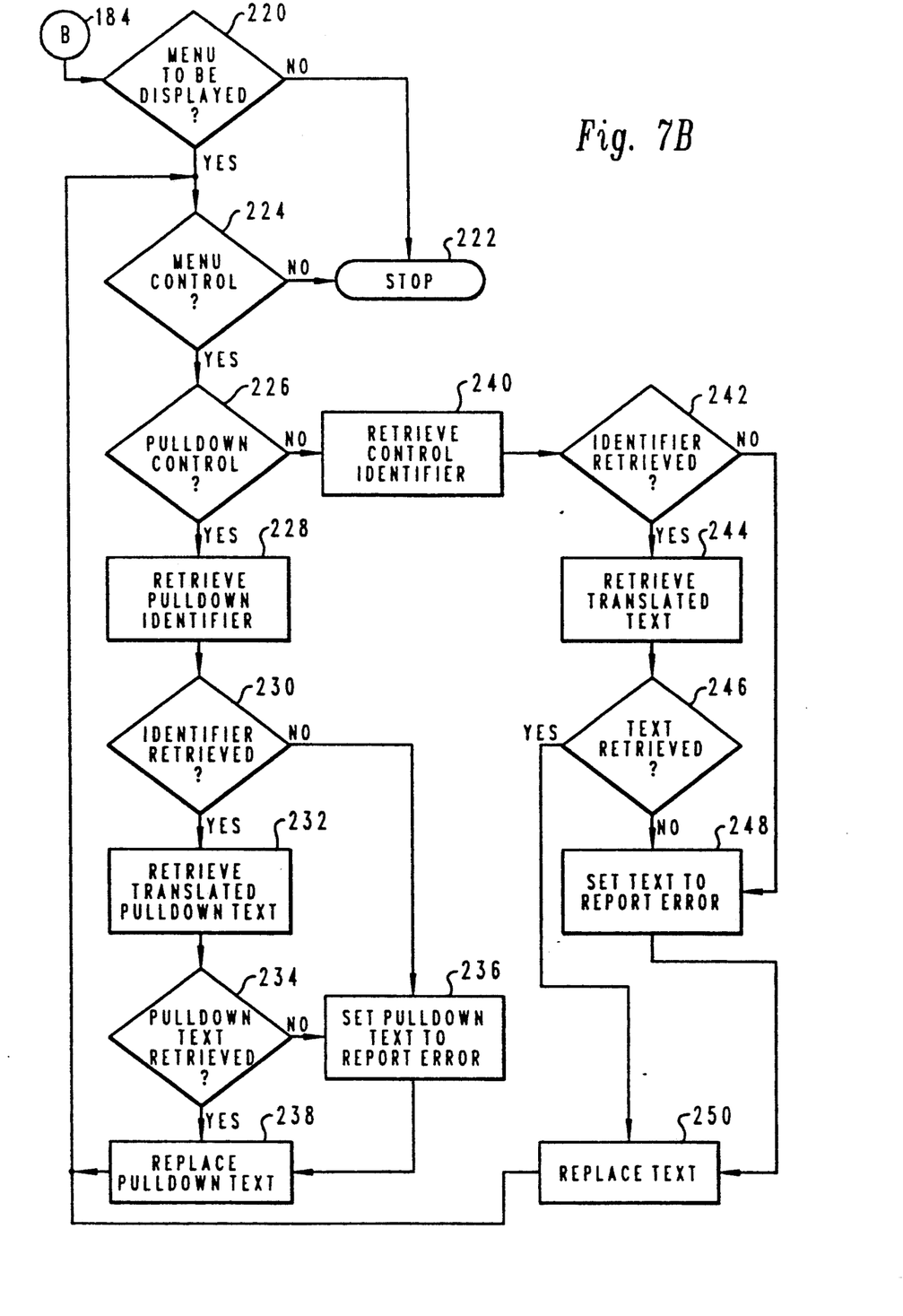

With reference now to FIGS. 7a and 7b, there is depicted a high level flowchart which illustrates the replacement of translated text within an interactive software application in accordance with the method and system of the present invention. As illustrated, the process begins at block 180, which assumes that a translation has occurred. As described above, those skilled in the art will appreciate that the method and system of the present invention are primarily directed to the facilitation of translation by means of the automatic extraction and reinsertion of text fields from an interactive software application and the precise mechanism utilized for translation is not specified herein.

After translation has occurred, the process passes to block 182. Block 182 illustrates a determination of whether or not a dialog box is to be displayed. Dialog template replacement is preferably performed while the program is actually running. Binary templates associated with a dialog box are loaded and the programming environment interfaces may be utilized to interrogate and enumerate the dialog entities. In the event a dialog box is not to be displayed, the process passes via connector 184 to the portion of the process described within FIG. 7b. However, in the event a dialog box is to be displayed, as determined at block 182, the process passes to block 186. Block 186 illustrates a determination of whether or not the dialog box to be displayed includes a textual caption or window title. If not, the process then passes to block 188 which illustrates a determination of whether or not additional text fields are present within the template associated with the dialog box.

Referring again to block 186, in the event the dialog box to be displayed includes a textual caption, the process passes to block 190. Block 190 illustrates the retrieval of the caption identifier, utilizing the translated text which has been defined by the identifier associated with the artificial control utilized to link the textual caption to a text string. The process then passes to block 192 which illustrates a determination of whether or not the caption identifier has been retrieved. If not, the process passes to block 198, which illustrates the setting of the caption text to report an error, indicating to the user that reinsertion of the translated text has not successfully occurred.

In the event the caption identifier has been successfully retrieved, as determined at block 182, the process passes to block 194. Block 194 illustrates the retrieval of the translated caption text from the translation table and the process then passes to block 196. Block 196 illustrates a determination of whether or not the translated caption has been successfully retrieved. If not, as described above, the process passes to block 198, which illustrates the setting of the caption text to report an error, indicating that successful reinsertion of the translated caption text has not occurred. Referring again to block 196, in the even the translated caption has been successfully retrieved, the process passes to block 200, which illustrates the replacement of the caption text. Further, as described above, after setting the caption text to report an error, as illustrated at block 198, the process also passes from block 198 to block 200, which depicts the replacement of the caption text.

Thereafter, after either replacing the caption text with the translated caption, or with a caption text which reports an error, the process passes to block 188. Additionally, as described above, the process may pass directly to block 188 in the event the dialog box encountered does not include a textual caption. Block 188 illustrates a determination of whether or not additional text field controls are present within the dialog box and if not, the process passes, via connector 184, to that portion of the process described within FIG. 7b.

In the event additional text field controls are present within the dialog box, as determined at block 188, the process passes to block 202. Block 202 depicts the retrieval of the text identifier for each text field present within the dialog box and the process then passes to block 204. Block 204 illustrates a determination of whether or not the identifier for the associated text field has been successfully retrieved. If not, the process passes to block 210, which illustrates the setting of the text to indicate an error condition has occurred.

Referring again to block 204, in the event the identifier of the text field has been successfully retrieved, the process passes to block 206. Block 206 illustrates the retrieval of the translated text and thereafter, block 208 illustrates a determination of whether or not the translated text has been successfully retrieved. As above, in the event the translated text has not been successfully retrieved, the process passes to block 210 which illustrates the setting of the text to report an error condition.

After setting of the text to report an error condition, or after successfully retrieving the translated text for the remaining text fields within the dialog box, the process passes to block 212, which illustrates the replacement of the text fields within the dialog box in the manner described above. Those skilled in the art will appreciate that this process continues in an iterative fashion until each dialog box and text field within a dialog box has either been successfully replaced with a translated textual field or an error message indicating that reinsertion of a translated textual field has not been possible.

Finally, referring to FIG. 7b, after processing each dialog box or text field within a dialog box as described with respect to FIG. 7a, the process passes, via connector 184, to block 220. Block 220 illustrates a determination of whether or not a menu template is to be displayed. If not, the process merely passes to block 222 and terminates. In the event a menu template is to be displayed, as determined at block 220, the process passes to block 224. Block 224 illustrates a determination of whether or not a menu control has been encountered and if not, the process passes again to block 222 and terminates.

Referring again to block 224, in the event a menu control has been encountered, the process passes to block 226. Block 226 illustrates a determination of whether or not the control encountered within the menu template is a pulldown, or high level menu selection control. If so, the process passes to block 228. Block 228 illustrates the retrieval of the pulldown identifier associated with the artificial control which was associated with the first submenu item within the pulldown menu. The process then passes to block 230 which illustrates a determination of whether or not the pulldown identifier was successfully retrieved.

Referring again to block 230, in the event the pulldown identifier has not been successfully retrieved, the process passes to block 236 which illustrates the setting of the pulldown text to report an error condition, indicating that successful reinsertion of the translated text was not possible. In the event the pulldown identifier was successfully retrieved, as determined at block 230, the process passes to block 232. Block 232 illustrates the retrieval of the translated pulldown text from the translate table and the process then passes to block 234.

Block 234 illustrates a determination of whether or not the translated pulldown text was successfully retrieved and, if not, the process again passes to block 236 which illustrates the setting of the pulldown text to report an error condition. Thereafter, in the event the pulldown text was successfully retrieved, or after setting the pulldown text to report an error, block 238 illustrates the replacement of the pulldown text within the menu template.

Referring again to block 226, in the event a pulldown control is not present with in the menu template under consideration, the process passes to block 240. Block 240 illustrates the retrieval of the control identifier for the menu control encountered and the process then passes to block 242. Block 242 illustrates a determination of whether or not the identifier for the present control has been successfully retrieved, and if not the process passes to block 248, which illustrates the setting of the text to report an error, indicating that reinsertion of the translated text has not successfully occurred.

Referring again to block 242, in the event the identifier of the text for the menu control has been successfully retrieved, the process passes to block 244. Block 244 illustrates the retrieval of the translated text and the process then passes to block 246. Block 246 illustrates a determination of whether or not the translated text has been successfully retrieved, and if not, the process again passes to block 248 which illustrates the setting of the text to report an error condition.

Thereafter, in the event the translated text has been successfully retrieved or after setting the text to indicate an error condition has occurred, the process passes to block 250, which illustrates the replacement of the text within the menu template. Thereafter, or after having replaced the pulldown text as illustrated at block 238, the process returns iteratively to block 224 to continue to process the interactive software application until such time as translated text has been reinserted in each menu template within the interactive software application.

Upon reference to the foregoing, those skilled in the art will appreciate that the Applicants herein have provided a novel method and system whereby text fields which exist either independently within an interactive software application or within structured user-interface forms, such as dialog boxes or menu templates, may be associated with a selected control parameter which may thereafter be utilized to automatically extract text fields from an interactive software application for translation. Additionally, this technique may be readily applied to other user-interface forms which do not readily permit the association of control parameters, by utilizing the method and system described herein. After translation of each text field, the translated text may be reinserted within the interactive software application utilizing the aforementioned control parameters, greatly facilitating the translation of interactive software applications into foreign languages.

While the invention has been particularly shown and described with reference to a preferred embodiment, it will be understood by those skilled in the art that various changes in form and detail may be made therein without departing from the spirit and scope of the invention.

We claim:

1. A method for facilitating translation of text fields within an interactive software application in a data processing system, wherein said interactive software application includes at least one dialog box having a caption, said method comprising the data processing system implemented steps of:
    associating a control parameter with each text field within said interactive software application prior to said translation;
    associating a control parameter with said at least one dialog box which includes an identification of a text field to be utilized for said caption;
    scanning said interactive software application to locate each control parameter therein;
    extracting each text field associated with a located control parameter for translation;
    inserting each translated text field into said interactive software application at a location within said interactive software application determined utilizing said located control parameter; and
    returning an error message in response to an absence of a control parameter which includes an identifier of a text field to be utilized for said caption.

2. The method for facilitating translation of text fields within an interactive software application in a data processing system according to claim 1, further including a plurality of text fields within said at least one dialog box and wherein said step of associating a control parameter with each text field within said interactive software application prior to said translation comprises the step of providing expansion space in association with each control parameter associated with each text field within said at least one dialog box wherein said control parameter may be lengthened to accommodate a possible increase in size of each text field due to translation.

3. A data processing system for facilitating translation of text fields within an interactive software application within said data processing system, wherein said interactive software application includes at least one dialog box having a caption, said data processing system comprising:
    means for associating a control parameter with each text field within said interactive software application prior to said translation;
    means for associating a control parameter with said at least one dialog box which includes an identification of a text field to be utilized for said caption;
    means for scanning said interactive software application to locate each control parameter therein;
    means for extracting each text field associated with a located control parameter for translation;
    means for inserting each translated text field into said interactive software application at a location within said interactive software application determined utilizing said located control parameter; and
    means for returning an error message in response to the absence of a control parameter which includes an identifier of a text field to be utilized for said caption.

4. The data processing system for facilitating translation of text fields within an interactive software application within said data processing system according to claim 2, further including a plurality of text fields within said at least one dialog box and wherein said means for associating a control parameter with each text field within said interactive software application prior to said translation further comprises means for providing expansion space in association with each control parameter associated with each text field within said at least one dialog box wherein said control parameter may be lengthened to accommodate a possible increase in size of each text field due to translation.

5. A method for facilitating translation of text fields within an interactive software application in a data processing system, wherein said interactive software application includes at least one high level menu selection having a plurality of submenu selections associated therewith, said method comprising the data processing system implemented steps of:
    associating a control parameter with each text field within said interactive software application prior to said translation;
    associating a control parameter with a first of said plurality of submenu selections which includes an identifier of a text field to be utilized for said high level menu selection;
    scanning said interactive software application to locate each control parameter therein;
    extracting each text field associated with a located control parameter for translation;
    inserting each translated text field into said interactive software application at a location within said interactive software application determined utilizing said located control parameter; and
    returning an error message in response to an absence of a control parameter which includes said identifier of a text field to be utilized for said high level menu selection.

6. A data processing system for facilitating translation of text fields within an interactive software application in a data processing system, wherein said interactive software application includes at least one high level menu selection having a plurality of submenu selections associated therewith, said data processing system comprising:
    means for associating a control parameter with each text field within said interactive software application prior to said translation;
    means for associating a control parameter with a first of said plurality of submenu selections which includes an identifier of a text field to be utilized for said high level menu selection;
    means for scanning said interactive software application to locate each control parameter therein;
    means for extracting each text field associated with a located control parameter for translation;
    means for inserting each translated text field into said interactive software application at a location within said interactive software application determined utilizing said located control parameter; and
    means for returning an error message in response to an absence of a control parameter which includes said identifier of a text field to be utilized for said high level menu selection.

* * * * *